UNITED STATES PATENT OFFICE 2,286,663

REDUCTION OF INORGANIC OXIDIC COMPOUNDS BY SILICON MONOXIDE

Eduard Zintl, Darmstadt, and Hans Grube, Sandersdorf, Kreis Bitterfeld, Germany

No Drawing. Application May 14, 1940, Serial No. 335,138. In Germany May 17, 1939

4 Claims. (Cl. 75—89)

The present invention relates to a process for reducing oxidic compounds of volatile elements.

The present invention is based on the observation that silicon monoxide which has hitherto been applied as an abrasive and as a dyestuff may be used with advantage for the reduction of oxidic compounds of volatile elements. In that case the volatile elements are obtained in a technically pure form so that they are suitable for a further treatment.

Attempts have already been made for separating at a temperature below 100° C. the metals in a finely subdivided form in which they may be used as catalysts, from metallic salt solutions by means of compounds of silicon and oxygen having a reducing action and a lower degree of oxidation than $SiO_2$, for instance oxidilisine, $(Si_2H_2O)$. The reduction process of the present invention according to which silicon monoxide is used as a reducing agent and a reduction temperature essentially exceeding 100° C. is required is not obvious by the known process.

The reduction process according to the present invention is advantageously performed under reduced pressure or in an atmosphere of an inert gas. In many cases the basic, oxidic constituents are bound by the silicon dioxide formed during the process. For obtaining a good yield, for instance in the reduction of magnesium oxide, it has, therefore, been found suitable by basic admixtures, preferably by the addition of lime, to bind as silicate, advantageously as calcium ortho-silicate, the silicic acid formed. The reduction of magnesium oxide then occurs according to the equation $$MgO + SiO + 2CaO = Mg + Ca_2SiO_4$$

If the starting product is already calcareous, as is for instance the case if tricalciumphosphate is treated, a stoichiometric composition of the starting material results which is evident from the following equation:

$$Ca_3(PO_4)_2 + 5SiO + 7CaO = 2P + 5Ca_2SiO_4$$

On treating an ore containing silicate the quantities of silicon dioxide already present in the starting product must be considered when the quantity of lime to be added is calculated: this is, for instance the case of a zinc silicate is treated. In the latter case the reaction occurs according to the following equation:

$$xZnO \cdot ySiO_2 + xSiO + 2(x+y)CaO = xZn + (x+y)Ca_2SiO_4$$

The following examples serve to illustrate the invention, but they are not intended to limit it thereto, the parts being by weight:

1. An intimate mixture of 41.0 parts of calcined dolomite (containing 32.4 per cent of MgO and 59.3 per cent of CaO), 33.6 parts of quicklime, 25.2 parts of commercial silicon monoxide (containing 60 per cent of SiO, the rest being $SiO_2$) and 1.0 part of fluorite is briqueted and the briquets are heated for 2 hours under reduced pressure to 1350° C. 99 per cent of the magnesium oxide present are condensed in the form of metal in a receiver.

2. The same mixture as described in Example 1 is heated under reduced pressure and kept for 1 hour at 1400° C. The entire quantity of magnesium is distilled and condensed in the receiver; no magnesium can any longer be found in the residue.

3. 2.44 parts of calcium phosphate (containing 53.5 per cent of CaO and 45.5 per cent of $P_2O_5$) are intimately mixed with 2.75 parts of commercial silicon monoxide (containing 75 per cent of SiO, the rest being $SiO_2$) and 5.1 parts of quicklime, the mixture is briqueted and the briquets are heated for 1½ hours under reduced pressure to 1260° C. 87.5 per cent of the phosphorus contained in the starting material are distilled; they are obtained by condensation.

4. 3.2 parts of previously calcined pyrolusite containing 66 per cent of manganese, the rest being oxygen, are thoroughly mixed with 4.2 parts of commercial silicon monoxide (containing 79 per cent of SiO, the rest being $SiO_2$) and 10 parts of quicklime and the mixture obtained is briqueted. The briqueted material is heated for 1½ hours under reduced pressure to 1300° C. 97 per cent of the manganese applied are distilled and condensed in the form of metal in a condenser.

5. 7.5 parts of a pre-calcined zinc ore containing

| | Per cent |
|---|---|
| $SiO_2$ | 4.25 |
| $Fe_2O_3$ | 0.81 |
| $Mn_2O_3$ | 0.42 |
| CaO | 67.7 |
| ZnO | 25.8 | are intimately mixed with 1.47 parts of commercial silicon monoxide (containing 79 per cent of SiO, the rest being $SiO_2$), the mixture is briqueted and the briquets are heated for 1 hour under reduced pressure to 1300° C. 98 per cent of the zinc present in the starting material volatilize and are obtained by condensation as a reguline metal.

6. 8.15 parts of pure zinc oxide are intimately mixed with 6.2 parts of commercial silicon monoxide (containing 79 per cent of SiO, the rest being $SiO_2$), the mixture is briqueted and the briquets are heated for 1 hour under reduced pressure to 1300° C. 80 per cent of the zinc present in the starting material volatilize and are condensed in a receiver as a reguline metal.

What we claim is:

1. The process for reducing inorganic oxidic compounds of elements which are volatile at the temperature at which said compounds are reduced by silicon monoxide, which comprises heating them together with silicon monoxide to reaction temperature in the presence of such an amount of lime that the total amount of $SiO_2$ formed during the reaction is bound as calcium silicate and removing the reduction product from the reaction mixture by distillation.

2. The process for reducing inorganic oxidic compounds of elements which are volatile at the temperature at which said compounds are reduced by silicon monoxide, which comprises heating them together with silicon monoxide to the reaction temperature and removing the reduction product from the reaction mixture by distillation.

3. The process for reducing inorganic oxidic compounds of elements which are volatile at the temperature at which said compounds are reduced by silicon monoxide, which comprises heating them together with silicon monoxide to the reaction temperature and removing the reduction product from the reaction mixture by distillation under reduced pressure.

4. The process for reducing inorganic oxidic compounds of elements which are volatile at the temperature at which said compounds are reduced by silicon monoxide, which comprises heating them together with silicon monoxide to the reaction temperature and removing the reduction product from the reaction mixture by distillation in the presence of an inert gas.

EDUARD ZINTL.
HANS GRUBE.